No. 647,442. Patented Apr. 10, 1900.
C. J. COLEMAN.
SECONDARY BATTERY.
(Application filed Oct. 2, 1899.)
(No Model.)
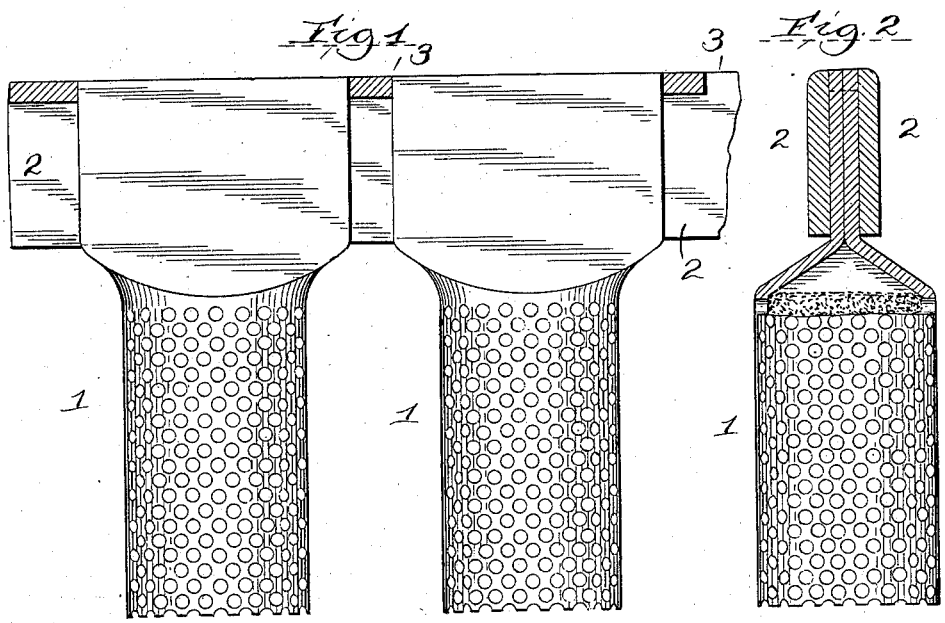
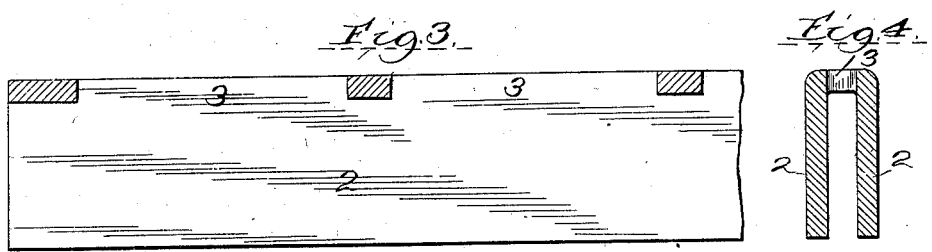
Attest
Harry R. White
R. White.
Inventor
Clyde J. Coleman
By Robert Burns Atty.

UNITED STATES PATENT OFFICE.

CLYDE J. COLEMAN, OF CHICAGO, ILLINOIS.

SECONDARY BATTERY.

SPECIFICATION forming part of Letters Patent No. 647,442, dated April 10, 1900.

Application filed October 2, 1899. Serial No. 732,356. (No model.)

*To all whom it may concern:*

Be it known that I, CLYDE J. COLEMAN, a citizen of the United States, and a resident of Chicago, in the county of Cook and State of Illinois, have invented certain new and useful Improvements in Secondary Batteries; and I do hereby declare the following to be a full, clear, and exact description of the same, reference being had to the accompanying drawings, forming a part of this specification.

The present invention relates to that type of secondary batteries in which the active material is inclosed within a perforated casing of conductive material, an example of which forms the subject-matter of my application for Letters Patent filed August 3, 1899, Serial No. 726,014.

The object of the present improvement is to provide a simple, effective, and durable means for connecting a series of foraminous tubular casings or holders to a common connecting strip or bar to constitute an electrode for secondary batteries, as will hereinafter more fully appear, and be more particularly pointed out in the claims.

In the accompanying drawings, illustrative of the present invention, Figure 1 is a fragmentary side elevation of a secondary battery electrode embodying the present invention, the connecting strip or bar being shown in longitudinal section; Fig. 2, a fragmentary transverse sectional elevation; Fig. 3, a detail longitudinal section of a portion of the connecting strip or bar in a detached condition, and Fig. 4 a cross-section of the same.

Similar numerals of reference indicate like parts in the different views.

As illustrated, the secondary-battery electrode of the present improvement will comprise a series of elongated tubular casings or holders 1, formed of perforated lead tubing or other like conducting material and arranged in parallel and separated relation, with their upper ends connected together by a conducting strip or bar 2, the general arrangement being substantially the same as that set forth in my aforesaid prior application, Serial No. 726,014.

The present improvement comprises the formation of the connecting bar or strip 2 of a folded or inverted-U shape, the crown portion of which is formed with elongated slots 3 to receive the extreme upper ends of the casing or holders 1, space being left between the two vertical members of the connecting-strip to receive the upper ends of the holders or casings 1, which are flattened together, as shown, to form a flat neck at the upper end of such casings. With such construction the assemblage of the parts is rendered very easy, and an extended surface contact is afforded, which contact can be rendered very perfect with regard to electrical conductivity by further compression of the assembled parts together.

With the ends of the casings or housings 1 occupying the slots 3 in the connecting bars or strips 2 and in an exposed condition at the top surface of the same a fusion of the different parts can be very readily and safely effected to attain still greater conductive unoin of the parts.

The series of tubular and perforated casings or holders 1 are filled with loose active material, such as oxid of lead, to constitute the completed battery-electrode, as usual in the present type of secondary battery.

Having thus fully described my said invention, what I claim as new, and desire to secure by Letters Patent, is—

1. In a secondary battery, the combination of a perforated conducting-casing for containing the active material and provided with a flattened upper end or neck, and a connecting strip or bar having an inverted-U shape and adapted to receive the flat neck of the casing between its vertical members, substantially as set forth.

2. In a secondary battery, the combination of a series of perforated conducting-casings for containing the active material, and provided with flattened upper ends or necks, and a connecting strip or bar common to the series and having an inverted-U shape and adapted to receive the flat necks of the series of casings between its vertical members, substantially as set forth.

3. In a secondary battery, the combination of a perforated conducting-casing for containing the active material and provided with a flattened upper end or neck, and a connecting strip or bar having an inverted-U shape and formed with an elongated orifice in its crown portion, the flattened neck of the casing being adapted to fit said orifice, and lie between the vertical members of the connecting bar or strip substantially as set forth.

4. In a secondary battery, the combination of a series of perforated conducting-casings for containing the active material and provided with flattened upper ends or necks, and a connecting strip or bar, common to the series, and having an inverted-U shape and formed with a series of elongated orifices in its crown portion, the flattened necks of the series of casings being adapted to fit said orifices and lie between the vertical members of the connecting bar or strip, substantially as set forth.

In testimony whereof witness my hand this 2d day of September, 1899.

CLYDE J. COLEMAN.

In presence of—
ROBERT BURNS,
HENRY A. NOTT.